US010186117B2

(12) United States Patent
Scott et al.

(10) Patent No.: US 10,186,117 B2
(45) Date of Patent: Jan. 22, 2019

(54) SIMULCAST PARI-MUTUEL GAMING MACHINE WITH CASINO AND LOTTERY STYLED WAGERS FOR CONTINUOUS PLAY

(71) Applicant: CANTOR INDEX, LLC, New York, NY (US)

(72) Inventors: Kenneth A. Scott, Scottsdale, AZ (US); Lawrence A. Krause, Scottsdale, AZ (US)

(73) Assignee: CANTOR INDEX, LLC, London (GB)

( * ) Notice: Subject to any disclaimer, the term of this patent is extended or adjusted under 35 U.S.C. 154(b) by 0 days.

(21) Appl. No.: 15/224,727

(22) Filed: Aug. 1, 2016

(65) Prior Publication Data

US 2016/0343212 A1 Nov. 24, 2016

Related U.S. Application Data

(63) Continuation of application No. 12/888,756, filed on Sep. 23, 2010, now Pat. No. 9,406,189, which is a (Continued)

(51) Int. Cl.
*G06F 17/00* (2006.01)
*G07F 17/32* (2006.01)

(52) U.S. Cl.
CPC .......... *G07F 17/3288* (2013.01); *G07F 17/32* (2013.01); *G07F 17/323* (2013.01); *G07F 17/3209* (2013.01); *G07F 17/3211* (2013.01); *G07F 17/3223* (2013.01); *G07F 17/3246* (2013.01); *G07F 17/3251* (2013.01); *G07F 17/3255* (2013.01); *G07F 17/3258* (2013.01);
(Continued)

(58) Field of Classification Search
None
See application file for complete search history.

(56) References Cited

U.S. PATENT DOCUMENTS

| | | | |
|---|---|---|---|
| 3,505,646 A | 4/1970 | Affel, Jr. et al. | |
| 4,288,077 A | 9/1981 | Rose et al. | |

(Continued)

FOREIGN PATENT DOCUMENTS

| | | |
|---|---|---|
| WO | WO 01/03089 A1 | 1/2001 |
| WO | WO 02/27675 A1 | 4/2002 |

OTHER PUBLICATIONS

U.S. Appl. No. 60/394,824, filed Jul. 10, 2002, Scott et al.
(Continued)

*Primary Examiner* — Paul A D'Agostino

(57) ABSTRACT

An gaming machine for and method of par-mutuel wagering that allows individuals to continuously place multiple casino and lottery styled pari-mutuel wagers on simulcast live and/or recorded pari-mutuel race events. The gaming machine includes a display screen to provide a graphic display of a plurality of pari-mutuel gaming options to a player, and a selection device operable by the player to select at least one of the pari-mutuel gaming options displayed on the screen, the selection device operable by the player to input a wager corresponding to the selected at least one pari-mutuel gaming option. The gaming machine has the ability to be linked to a network of gaming machines in pari-mutuel and/or other wagering venues.

12 Claims, 5 Drawing Sheets

Related U.S. Application Data continuation of application No. 10/616,779, filed on Jul. 10, 2003, now Pat. No. 7,803,046.

(60) Provisional application No. 60/394,824, filed on Jul. 10, 2002.

(52) U.S. Cl.
CPC . *G07F 17/3276* (2013.01); *Y10T 436/106664* (2015.01)

(56) References Cited

U.S. PATENT DOCUMENTS

| | | | | | |
|---|---|---|---|---|---|
| 4,540,174 | A | | 9/1985 | Coppock | |
| 4,842,278 | A | | 6/1989 | Markowicz | |
| 4,962,950 | A | | 10/1990 | Champion | |
| 5,048,833 | A | | 9/1991 | Lamie | |
| 5,106,089 | A | | 4/1992 | Wood | |
| 5,129,652 | A | | 7/1992 | Wilkinson | |
| 5,212,636 | A | * | 5/1993 | Nakazawa | G06Q 50/34 340/323 R |
| 5,265,877 | A | | 11/1993 | Boylan et al. | |
| 5,374,060 | A | | 12/1994 | Goldberg | |
| 5,476,259 | A | | 12/1995 | Weingardt | |
| 5,518,239 | A | | 5/1996 | Johnston | |
| 5,540,442 | A | | 7/1996 | Orselli et al. | |
| 5,560,603 | A | | 10/1996 | Seelig et al. | |
| 5,564,977 | A | * | 10/1996 | Algie | G07C 15/006 463/25 |
| 5,613,679 | A | | 3/1997 | Casa et al. | |
| 5,669,606 | A | | 9/1997 | Brown | |
| 5,687,968 | A | | 11/1997 | Tarantino | |
| 5,695,192 | A | | 12/1997 | Brown | |
| 5,728,002 | A | | 3/1998 | Hobert | |
| 5,743,525 | A | | 4/1998 | Haddad | |
| 5,743,798 | A | | 4/1998 | Adams et al. | |
| 5,755,440 | A | | 5/1998 | Sher | |
| 5,758,878 | A | | 6/1998 | Brown | |
| 5,762,552 | A | | 6/1998 | Vuong et al. | |
| 5,769,714 | A | | 6/1998 | Wiener et al. | |
| RE35,864 | E | | 7/1998 | Weingardt | |
| 5,779,547 | A | | 7/1998 | SoRelle et al. | |
| 5,782,470 | A | | 7/1998 | Langan | |
| 5,782,472 | A | | 7/1998 | Brown | |
| 5,788,240 | A | | 8/1998 | Feinberg | |
| 5,795,226 | A | | 8/1998 | Yi | |
| 5,800,263 | A | | 9/1998 | Hayashida et al. | |
| 5,810,360 | A | | 9/1998 | Srichayapom | |
| 5,816,575 | A | | 10/1998 | Keller | |
| 5,823,536 | A | | 10/1998 | Flasch | |
| 5,823,872 | A | | 10/1998 | Prather et al. | |
| 5,823,879 | A | | 10/1998 | Goldberg et al. | |
| 5,830,068 | A | * | 11/1998 | Brenner | G06Q 50/34 463/42 |
| 5,836,816 | A | | 11/1998 | Bruin et al. | |
| 5,848,936 | A | | 12/1998 | Morrison | |
| 5,851,149 | A | | 12/1998 | Xidos et al. | |
| 5,888,136 | A | | 3/1999 | Herbert | |
| 5,957,775 | A | | 9/1999 | Cherry | |
| 6,004,211 | A | * | 12/1999 | Brenner | G06Q 50/34 463/25 |
| 6,309,307 | B1 | | 10/2001 | Krause et al. | |
| 6,331,148 | B1 | | 12/2001 | Krause et al. | |
| 6,450,887 | B1 | | 9/2002 | Mir et al. | |
| 6,542,163 | B2 | | 4/2003 | Gorbet et al. | |
| 6,554,708 | B1 | | 4/2003 | Brenner et al. | |
| 7,803,046 | B2 | | 9/2010 | Scott et al. | |
| 9,406,189 | B2 | | 8/2016 | Scott et al. | |
| 2001/0003099 | A1 | * | 6/2001 | Von Kohorn | H04N 7/0884 463/40 |
| 2001/0031656 | A1 | * | 10/2001 | Marshall | G06Q 50/34 463/6 |
| 2001/0037211 | A1 | * | 11/2001 | McNutt | G06Q 20/3674 463/29 |
| 2001/0039209 | A1 | * | 11/2001 | DeWeese | G07F 17/3288 463/40 |
| 2002/0065566 | A1 | * | 5/2002 | Aronson | G07F 17/32 700/91 |
| 2002/0151363 | A1 | * | 10/2002 | Letovsky | G07F 17/32 463/40 |
| 2003/0003990 | A1 | * | 1/2003 | Von Kohorn | H04N 7/0884 463/25 |
| 2003/0045336 | A1 | * | 3/2003 | Cherry | G07F 17/32 463/16 |
| 2003/0064805 | A1 | * | 4/2003 | Wells | G07F 17/32 463/39 |
| 2003/0104865 | A1 | * | 6/2003 | Itkis | G07F 17/32 463/39 |
| 2003/0157976 | A1 | * | 8/2003 | Simon | G06Q 50/34 463/1 |

OTHER PUBLICATIONS

International Search Report for International Application No. PCT/US03/21553, dated Jan. 26, 2005 (9 pages).

European Office Action for Application No. 03763436.7, dated Aug. 1, 2007 (7 pages).

U.S. Appl. No. 09/378,327 (U.S. Pat. No. 6,309,307 issued Oct. 2001) in the name of Krause, et. al.; Transaction History: Office Action dated Sep. 13, 2000; Examiner Interview Summary: dated May 1, 2001; Notice of Allowance dated: May 7, 2001; Response to 312 Amendment dated: Aug. 24, 2001.

U.S. Appl. No. 09/267,865 (U.S. Pat. No. 6,331,148 issued Dec. 2001) in the name of Krause, et. al.; Transaction History: Office Action dated: May 10, 2000; Final Office Action dated: Aug. 29, 2000; Advisory Action dated: Apr. 4, 2001; Examiner Interview Summary dated Apr. 16, 2001; Examiner Interview Summary: dated May 1, 2001; Notice of Allowance dated: May 8, 2001; Response to 312 Amendment dated Nov. 7, 2001.

European Patent Office Communication for Application No. 03763436.7, dated Oct. 18, 2006, forwarding Supplementary European Search Report dated Oct. 12, 2006 (3 pages).

USPTO Office Action for U.S. Appl. No. 10/616,779, dated Dec. 22, 2006 (8 pages).

USPTO Office Action for U.S. Appl. No. 10/616,779, dated Jul. 3, 2007 (9 pages).

USPTO Office Action for U.S. Appl. No. 10/616,779, dated Dec. 27, 2007 (10 pages).

USPTO Advisory Action for U.S. Appl. No. 10/616,779, dated Sep. 18, 2007 (3 pages).

USPTO Office Action for U.S. Appl. No. 10/616,779, dated Oct. 29, 2008 (8 pages).

USPTO Pre-Brief Appeal Conference decision for U.S. Appl. No. 10/616,779, Jun. 16, 2009 (2 pages).

USPTO Notice of Allowance and Fees Due for U.S. Appl. No. 10/616,779, dated May 27, 2010 (7 pages).

* cited by examiner

SIMULCAST PARI-MUTUEL GAMING MACHINE WITH CASINO AND LOTTERY STYLED WAGERS FOR CONTINUOUS PLAY

RELATED APPLICATIONS

This application is a continuation of U.S. patent application Ser. No. 12/888,756 filed Sep. 23, 2010, which is a continuation of U.S. patent application Ser. No. 10/616,779 (now U.S. Pat. No. 7,803,046 issued on Sep. 28, 2010), which claims priority to U.S. Provisional Patent Application No. 60/394,824 filed on Jul. 10, 2002, entitled "Simulcast Pari-Mutuel Gaming Machine with Casino and Lottery Styled Wagers for Continuous Play," each of which is hereby incorporated by reference herein in its entirety.

FIELD OF THE INVENTION

The invention relates generally to gaming machines, and in particular, to a gaming machine and method of using the same for allowing wagers to continuously place on simulcast live and/or recorded pari-mutuel race events.

BACKGROUND OF THE INVENTION

Casinos utilizing various gaming devices such as slot machines have become very popular due to the ease of play and widespread availability of such machines. The popularity of these casino gaming devices has come at the expense of pari-mutuel racing operators who have seen their share of the gaming market dwindle. As a result, it is highly desirable to provide a gaming machine and method of use that allows for the pari-mutuel racing operators to take advantage of these highly popular forms of wagers.

SUMMARY OF THE INVENTION

In accordance with the present invention, a gaming machine is provided that allows individuals to continuously place multiple casino and lottery styled pari-mutuel wagers on simulcast live and/or recorded pari-mutuel race events. The gaming machine has the ability to be linked to a network of said gaming machines in pari-mutuel and/or other wagering venues such that the gaming machines function under current simulcast regulations with jurisdictional approval of said wagers.

In one embodiment, the gaming machine includes a display screen to provide a graphic display of a plurality of pari-mutuel gaming options to a player, and a selection device operable by the player to select at least one of the pari-mutuel gaming options displayed on the screen, the selection device operable by the player to input a wager corresponding to the selected at least one pari-mutuel gaming option. The gaming machine has the ability to be linked to a network of gaming machines in pari-mutuel and/or other wagering venues.

In another embodiment, the invention provides for a method of pari-mutuel wagering, that includes the steps of providing a pari-mutuel gaming machine, displaying a plurality of pari-mutuel game options to a player, and placing a pari-mutuel wager on at least one of the plurality of pari-mutuel game options displayed to the player.

DETAILED DESCRIPTION

Figure 1:
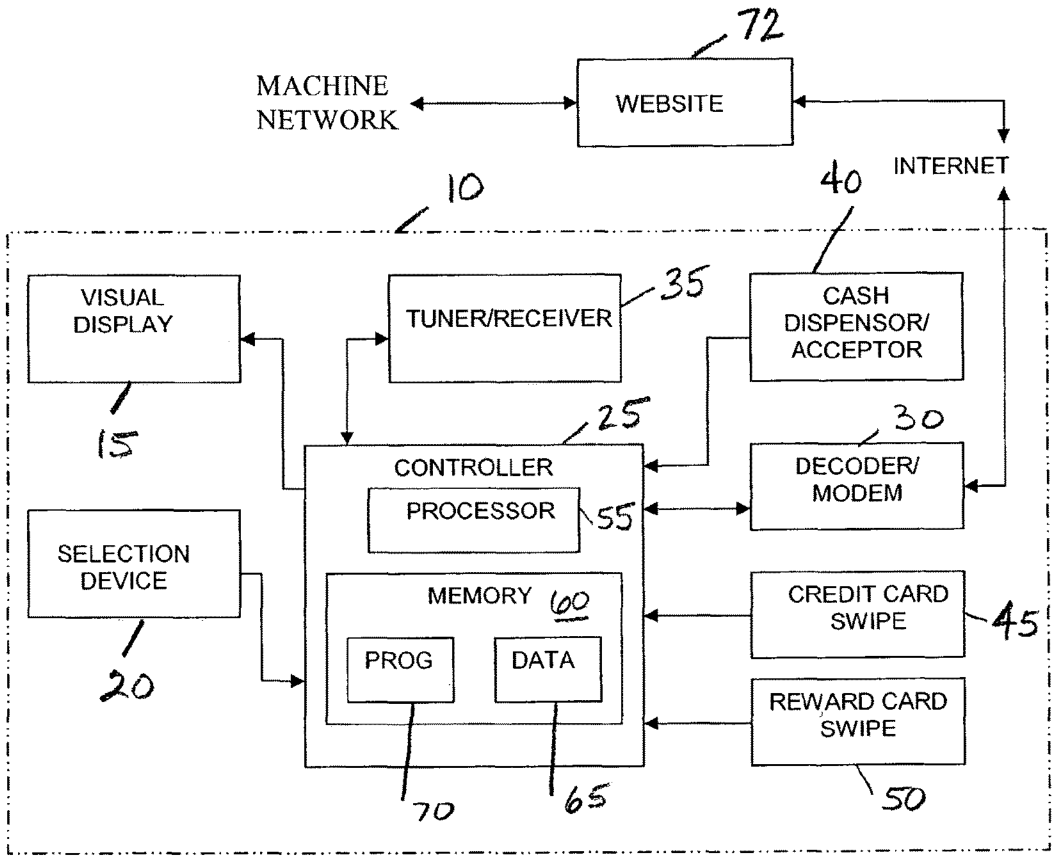
FIG. 1 is a schematic diagram of a first embodiment of a gaming device in accordance with the present invention.

FIG. 1 is a schematic diagram of one embodiment of a gaming machine 10 in accordance with the invention. The gaming machine 10 includes a display screen 15, a selection device 20, a controller 25 to execute instructions of the program or software package, a modem 30, a tuner/receiver 35, a cash acceptor/dispenser 40, a credit card swipe device 45, and a reward card swipe device 50.

The display screen 15 provides an interface that allows the player to interact with the machine 10. Example display screens 15 can include touch-screens, monitors, panels, etc. The display screen 15 provides graphical images and/or frames that include a selection of options and entries available to the player as described for the method in FIGS. 2-5. In addition, the screen 15 provides displays of logo graphic packages, displays of replays of winning races and wagers, displays of individual wager results, and payment effects of wagers.

The selection device 20 allows the player to provide inputs or make selections from options made available on the display screen 15. In one embodiment, the selection device 20 includes a touch-screen capable of interfacing with the player to receive inputs and to provide outputs. The touchscreen includes a display of each game option and wager, chronological order of races and post times, race odds, race participants, handicapping info, post time, pool, credits (on account, per play, cash out, etc.), game play frame to receive wagers, enter button to accept triggers (e.g., play again option, switch game option, switch track option, etc.) or wagers, request game instructions selection, review bets selection, "Back" button, "View Race" selection, picture-in-picture (PIP0 selection, record replay/results selection, "virtual pet" selection (discussed later), etc. Other examples of the selection device 20 include push buttons (keyboard, keypad, etc.), switches, pointing devices (e.g., mouse, a trackball), etc. know to those in the art.

In general, the controller 25 communicates with and/or controls the one or more display screens 15, selection devices 20, modem 30, tuner/receiver 35, cash dispensers 40, and credit card 45 and reward card 50 swipe devices, and other miscellaneous devices of the machine 10. In one embodiment, controller 25 includes a processor 55 and memory 60. The memory 60 includes data storage 65 and program/software storage 70. The data storage 65 stores, among other things, wager information input by the player with the selection device 20, recorded broadcasts of race events, etc. The wager information can be stored in memory at the individual machine as well as with a remote controller. The software storage 70 stores one or more software modules having instructions to configure the processor 55. The processor 55 obtains, interprets, and executes the instructions of the software. The software configures the processor 55 to perform, among other things, the method described in FIGS. 2-5. Among its functions, the processor 55 provides visual display or frames of available playing options, provides real-time or live displays of races, receives signals input by the player to the selection device, provides signals to the modem for communication over the internet, and other functions apparent to one skilled in the art from the operation description below. In the shown embodiment in FIG. 1, the controller 25 is located at the machine 10. In another embodiment, the controller 25 can be located remote from the machine 10 and in communication with a network of machines via the internet.

The decoder/modem 30 provides communication between the machine 10 over the internet with remote controller and/or a network of other machines via a website 80. In one embodiment, the decoder/modem 30 translates signals received by the tuner/receiver and standard pari-mutuel information for transmission via the internet to website 72 operated by a remote controller. In addition, the decoder/modem 30 communicates signals to the website 80 that represent a wager placed by the player at an individual machine 10. The remote controller 25 includes a software package to configure a website linking a network of machines.

The website 80 provides the player with information including, but not limited to, game play and tips with simulated wagers, specific track information with pool and jackpot updates and alerts, notifications of substantial payouts to winners. The website 80 also includes a capacity to receive signals from the decoder/modem 30, send electronic mailings to a player address regarding updates, alerts, incentives, promotions, substantial payouts, and/or other information. The website 80 also chronologically arranges and makes races/pools available for betting, provides simplified handicapping functions and statistics, provides standard pari-mutuel information (e.g., pools, posts, odds, runner, etc.), sends bets to totes for sorting and money into pools, receives results of games/races from totes, records and files game/race results, bundles race/game results for transmission, provides notification of network of machines when results are ready, provides ancillary game play and interaction between the player and machine 10 and/or other players via the internet, and responds to requests for replay of bet races from individual machines 10, and provides upon request replays of races and game results with pay information.

The tuner/receiver 35 receives and provides signals representative of live broadcasts of various races at participating track venues/locations for display and/or recordation at the command of the player or the machine 10. In one embodiment, the tuner/receiver 35 includes satellite dishes to receive race signals. The race signals are broadcast by horse tracks, harness tracks, dog tracks, etc. from across the United States, Canada, Caribbean, Hong Kong, Japan, South Korea, United Kingdom, Australia, etc.

The controller 25 communicates with the tuner/receiver 35 to select reception of the signal from a track selected by the player using the selection device 20. The player dictates display of the live broadcast. Alternatively, the machine 10 dictates the live broadcast of the track selection.

The cash acceptor/dispenser 40 includes devices known in the art to distribute and/or receive wager/winnings to and from the player. The credit card swipe device 45 includes devices known in the art that communicates with a credit card to allow the player to use credit to place pari-mutuel wagers. The reward card swipe device 50 allows the machine 10 to communicate data to reward cards related to reward and incentive offers to players. In one embodiment, the credit card swipe device 45 and/or reward card swipe device 50 include a swipe system to communicate with a player's credit card or reward card, similar to current swipe card systems on standard slot machines. Of course, other known credit card devices and reward card devices can be used. With reward cards, the machine 10 monitors and records data to a player's reward card related to various operating criteria (e.g., amounts wagered, time spent playing, frequency of visits, etc.) of the player at the machine 10. The player accumulates points on the reward card that can be exchanged for incentives and/or rewards offered by pari-mutuel gaming operators.

Figure 2:
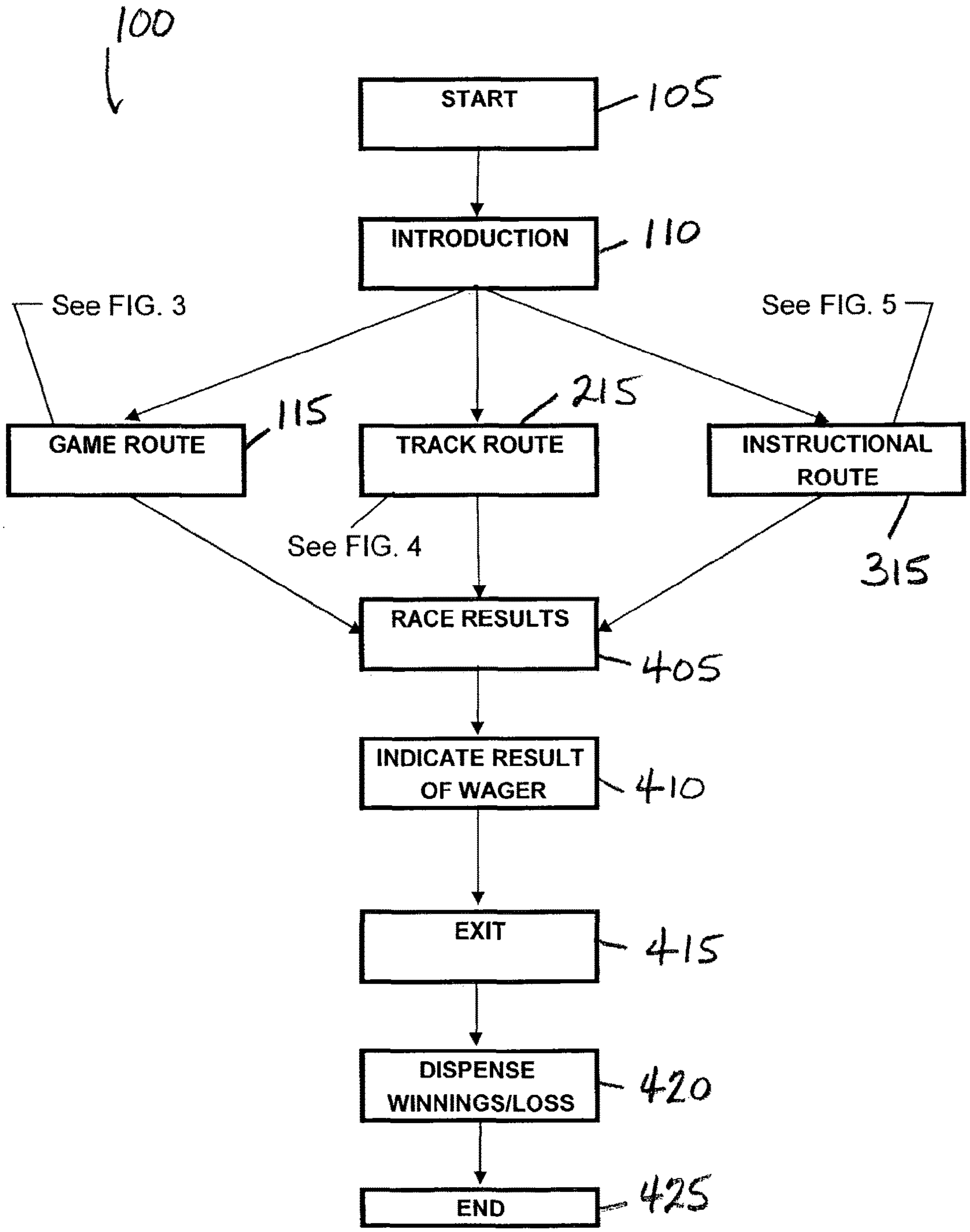
FIG. 2 is a flow diagram of a first embodiment of a pari-mutuel game in accordance with the present invention.

Having described the basic architecture of one embodiment of the gaming machine 10, the method 100 of operation of the gaming machine 10 will now be described as shown in FIG. 2. It is envisioned that the method 100 of operation can be modified for other embodiments of the gaming machine 10. Furthermore, it is envisioned that not all the acts may be required, that some of the acts may be modified, or that the order of the acts may vary.

As shown in FIG. 2 and at act 105, a player activates or starts the gaming machine 10. At act 110, one embodiment of invention includes the machine 10 providing a graphic display on the display screen that includes an introduction to at least three function routes by which the player can make wagers. These function routes include a game-based route, a track-based route, and an instructional route. Using the selection device 20, the player selects from one of the at least three routes to begin play. The number routes available to the player can vary and is not limiting on the invention.

1. Game-Based Route for Play

At act 115, the player selects the game-based route (e.g., "Pick A Game") from an introduction graphic display on the display screen 15.

Figure 3:
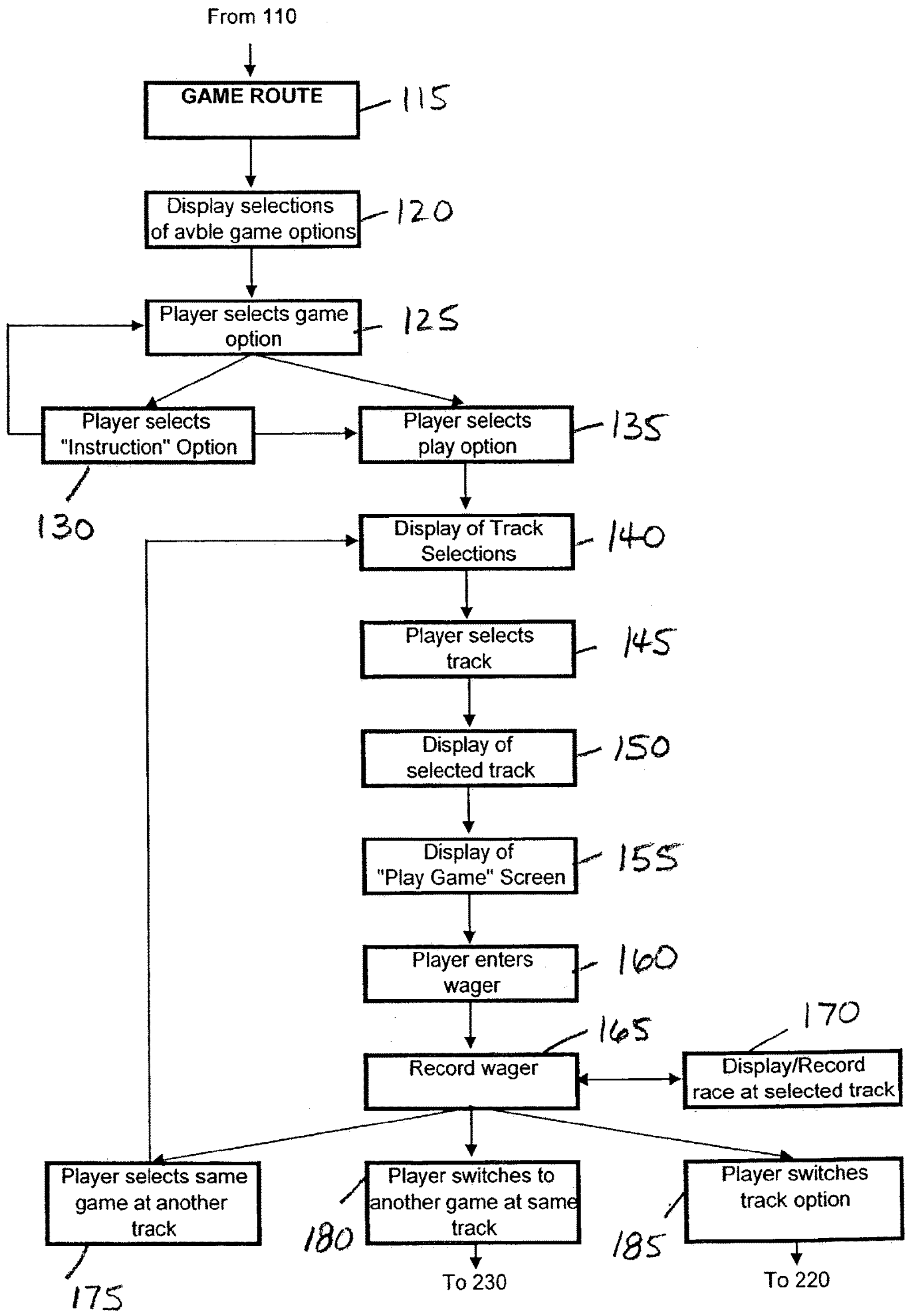
FIG. 3 is a flow diagram of a second embodiment of a pari-mutuel game in accordance with the present invention.

As shown in FIG. 3 and at act 120, the machine 10 provides a graphic display of a game display frame that identifies all the available game options for play. A game option includes various ways and At act 125, the player selects a particular game option from a game display frame. At act 130, the machine 10 provides an instructional option or a play game option. Each particular game has an instructional option and a play game option. If a player selects the instructional option (act 130), the machine 10 provides a display of that game's explanation page in the instructional route, described later. At the display of the explanation page, the player can switch games or proceed to a track selection frame, discussed later.

If the player selects the play game option (act 135), the machine 10 forwards the player to a track selection frame (act 140). The track selection frame displays the tracks at which the selected game is available with or without post time(s) for upcoming race(s), various betting pools, jackpots, rollovers, and/or other information. At act 145, the player selects a specific track at which to play the selected game.

At act 150, the machine 10 provides a graphic display of a selected track frame. The specific track frame includes a display of the next race(s) post/start time, race odds, a display of and/or an option for the picks and/or program for the race, the specific game pool for the race(s), a play game option, and/or other options and information. The player can choose whether to review the available information before proceeding to the play game screen.

At act 155, the machine 10 provides a graphic display of a play game screen. The play game screen for the selected game allows the player to enter a wager for that particular game as predicated by its rules and functioning. At act 160, the player makes their play(s) and enters their wager(s) by activating an enter wager option. At act 165, the machine 10 records the play or wager for comparison against the outcome of the game for that race. In one embodiment, the wagers are stored in the individual machine with the player and transmitted to the website 72. The website 72 stores the wager and sends the wager to the totes for sorting and/or depositing into pools.

At act 170, the machine 10 provides a live broadcast of the track and/or records the broadcast of the track for playback at the player's command. In one embodiment, the machine 10 provides a broadcast of a selected race at the selected track in real time and/or live signal. In another embodiment, the race is run and the machine 10 digitally records the broadcast for subsequent replay at the request of the player or at the direction of the machine 10. This embodiment reduces lag time for payout tabulation and provides race and game results for comparison against the player's wager(s) upon completion of the digital recording and results tabulation for that race. Furthermore, this embodiment allows the player to replay the races and his wagers on them in a continuous succession of races and results. In yet another embodiment, the machine 10 provides the player with an option to view the entire race or a specifically timed portion of it. In yet another embodiment, the machine 10 provides a graphic display with a set of control options to pause, rewind, fast forward, or save the race image and/or their wagers and results. In yet another embodiment, the machine 10 provides the player with an option to email images/wagers/results to an address of the player's choosing. In yet another embodiment, the machine 10 provides a graphic display that allows the player to select from a list of the above-described embodiments. The machine 10 and software allows additional wagers to be made during a live broadcast or replay of a race event.

Upon entering the play or wager, the machine 10 provides a display of three options to the player. At act 175, the player selects an option for "Another Play" that returns the player to the play game frame from which the player can play the same selected game option at a previously selected track. At act 180, the player selects an option for "Switch Game" that allows the player to switch games while remaining at the same selected track by returning the player to the game selection frame in the track route. At act 185, the player selects an option for "Switch Track" that allows the player to play the same selected game at a different track by returning the player to the track selection frame in the game route. In one embodiment, a player interacts with various activators located on the graphic displays of the game selection frame, track selection frame, or other frames to switch games and/or tracks.

2. Track-Based Route for Play

Figure 4:
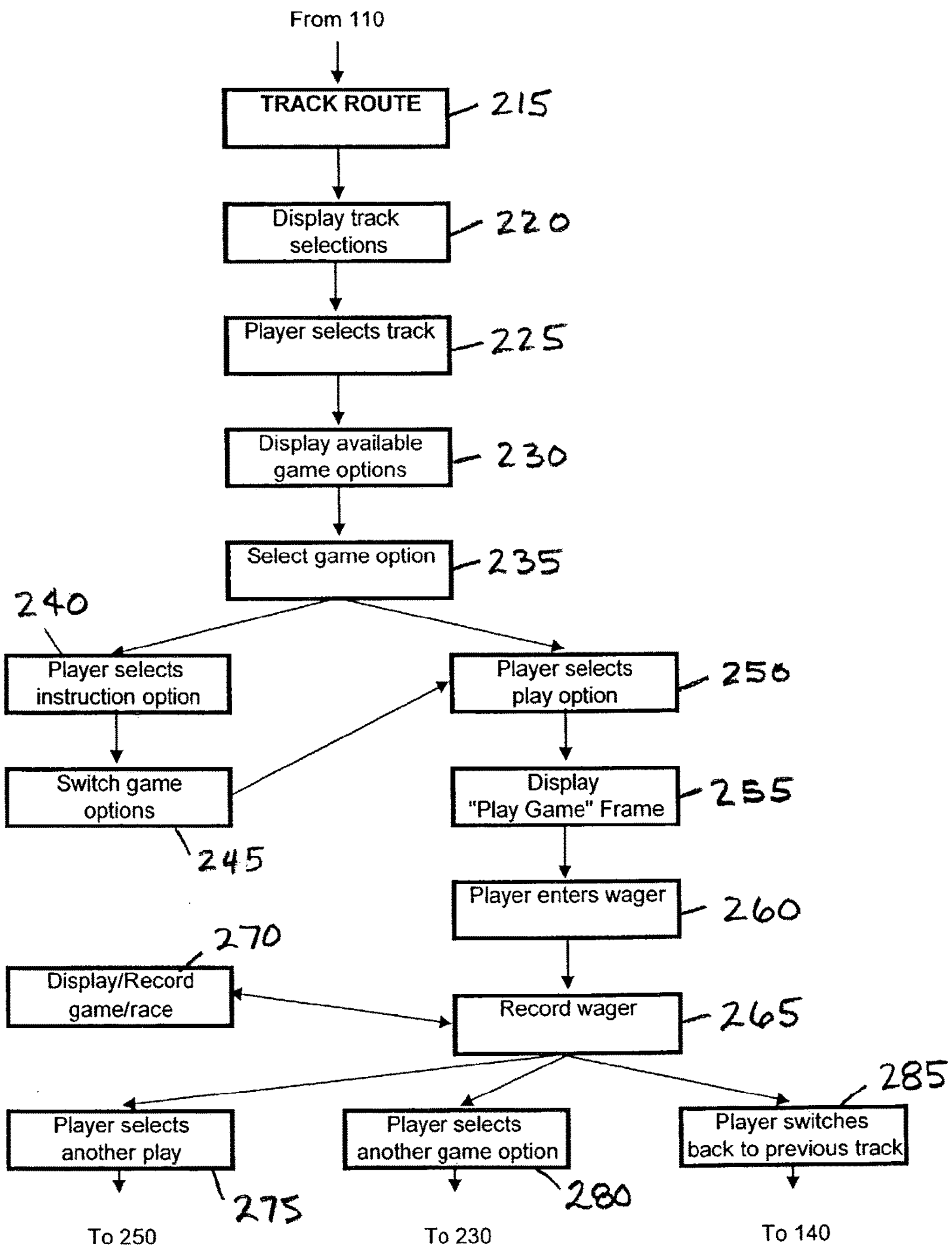
FIG. 4 is a flow diagram of a third embodiment of a pari-mutuel game in accordance with the present invention.

As shown in FIG. 4 and at act 215, the player selects the track route (e.g., "Pick A Track") from the introduction frame. At act 220, the machine 10 provides a display of a track selection frame. The track selection frame provides a graphical display of the tracks at which play is available with or without post/start time(s) for upcoming race(s), race odds, various betting pools, jackpots, rollovers, and/or other information. At act 225, the player selects a specific track at which to play.

At act 230, the machine 10 provides a graphical display of all the available games for play at the selected track with or without the above information. At act 235, the player selects a particular game from this game display frame. Each particular game frame has an instructional option and a play game option. If the player selects the instructional option (act 240), the machine 10 takes the player to that particular game's explanation page in the instructional route, discussed later. The player can switch game options (act 245) and/or proceed to select a play option (act 250).

If the player selects the play game option (act 250), the machine 10 forwards the player to a play game frame (act 255). The play game frame for a selected game allows the player to enter a wager for that particular game as predicated by its rules and functioning. At act 260, the player activates the wager option to make their play(s) and enter their wager(s). At act 265, the player's play or wager is recorded and retained for comparison against the outcome of the game for that race. At act 270, the machine 10 provides a display of the live broadcast of the selected track and/or records the particular track for playback at the player's command, similar to act 170 described above. In another embodiment, the machine 10 dictates the broadcast or replay of the race.

Upon recording the wager at act 265, the machine 10 provides a graphical display of three options to the player. If the player selects an option for "Another Play" (act 275), the machine 10 returns the player to the play game frame from which they play the same selected game at the previously selected track. If the player selects an option for "Switch Game" (act 280), the machine 10 switches the player to other game options while remaining at the same selected track by returning the player to the game selection frame in the track route at act 230. If the player selects an option for "Switch Track" (act 285), the machine lets the player select the same selected game at a different track by returning to the track selection frame in the game route at act 140.

3. Instructional Route for Play

Figure 5:
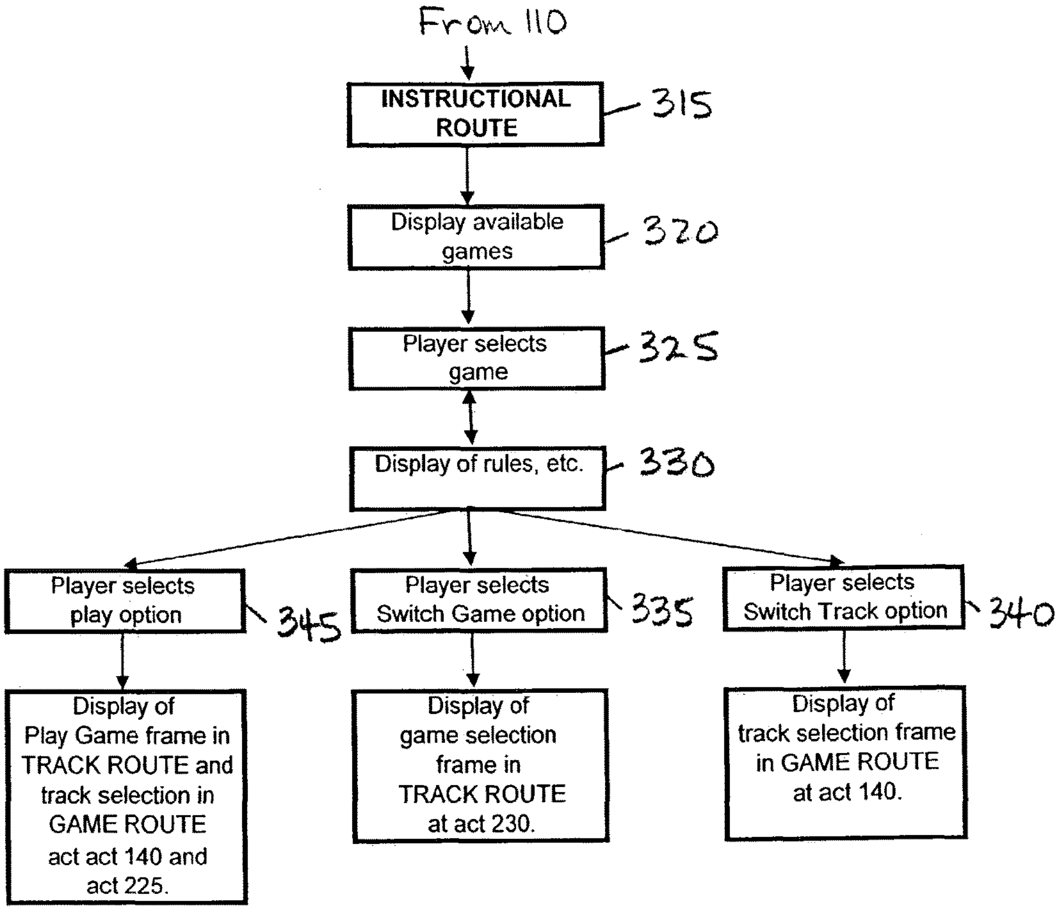
FIG. 5 is a flow diagram of a fourth embodiment of a pari-mutuel game in accordance with the present invention.

As shown in FIG. 5 and at act 315, the player selects the instructional route (i.e. "How to Play") from the introduction frame. At act 320, the machine 10 provides a graphical display frame of all the available games for play. At act 325, the player selects a particular game from the game display frame. At act 330, the machine provides a display of a game frame with an explanation of the game option that includes, but is not limited to, rules, game play, playing tips, and/or simulations for game play, a series of instructional display screen per game, simulated wagering, race viewing, and results. In another embodiment, each particular game frame has a play game option and/or a switch game option and/or a switch track option. In another embodiment, a link to the instructional route is available in each of the routes described above.

At act 335, the player selects the switch game option, and the machine 10 leads the player to the game selection frame within the track route at act 230. At act 340, the player selects the switch track option, and the machine 10 leads the player to the track selection frame within the game route at act 140. At act 345, the player selects the play game option, and the machine 10 forwards the player to the track selection frame within the game route at act 140 and to the play game frame within the track route at act 255.

Referring to FIG. 1 and at act 405, the results of each game/race event are determined and a notice is provided to the network of machines. In one embodiment, totes determine the winners for each game or race event and sends the results to the website. The website bundles the results for transmission and notifies the network of machines of the race event outcomes. The machine notifies the player that the race/game results for the bet race/game are ready. The player requests the results of the race event. The individual machine 10 communicates via the internet with the website to obtain the race/game results.

At act 410 (FIG. 1), the machine 10 compares the winning result against the stored wagers made by the player. In one embodiment, the machine 10 displays a video clip of the race outcome to the player and a display of the player's wager. The appropriate video response is triggered to indicate whether the player won or lost the wager.

At act 415 (FIG. 1), the player exits the machine 10. At act 420, the machine 10 provides credits and/or wagers and/or winnings/losses to the player. In one embodiment, the credits/wagers/winnings/losses are printed on payable betting slips, but other means of repayment or remuneration known to those in the art can be used. Act 425 is the end of the method 100 of pari-mutuel wagering.

In another embodiment of the method 100, regardless of the respective route selected by the player, the machine 10 provides a graphical display of the play game screen. Similar to play game screens displayed for the game options (act 155) and for the track options (act 255), the play game screen of a selected game provides a display to enter a wager for that particular game as predicated by the game's rules and function. The player activates the wager option and makes a play(s) and enters a wager(s). The machine 10 records and retains the play and wager for comparison against the outcome of the game for that race. The machine 10 provides a live display of the race and/or records the race for playback at the player's command. In yet another embodiment, the machine 10 dictates the broadcast or replay of the race.

Upon receiving and recording a wager, the machine 10 provides a graphical display of three options to the player. Under the first option, the player selects an option for "Another Play," and the machine 10 returns the player to the play game frame at act to allow the player to play the same selected game at the previously selected track. Under the second option, the player selects an option for "Switch Game," and the machine 10 returns the player to the game selection frame in the track route to allows the player to switch games while remaining at the same selected track. Under option three, the player selects an option for "Switch Track," and the machine 10 returns the player to the track selection frame in the game route to allow the player to play the same selected game at a different track.

4. Features/Options

The following is a description of features and options incorporated into the software of the gaming machine 10 to increase flexibility of the gaming machine 10 and to provide for a continuous flow of play and operational options.

a. Game Play Prompts, Tips, and Notices

The machine 10 can provide a visual display that notifies a player of ongoing or upcoming events on the machine network, including but not limited to wagering pools with high levels of activity, carry over jackpots for the various games at the various tracks, mandatory pay out events when/if required, pay out information from games at the various tracks, game play tips, machine operation cues, guides, and tips, and other information. These visual display notices call the player's attention to any of the above events and prompt the players to make wagers on opportunities for larger than average jackpots and payouts and or other potential outcomes of the notice. These notices enhance the pari-mutuel gaming experience and promote more efficient machine 10 operation. One embodiment of the notifications is a visual display having graphic and/or text combinations, sound cues, special lighting, and/or other displays or methods. In another embodiment, the machine 10 can provide a display of the notifications using a player's virtual assistant and/or pet, discussed below.

b. Personalized Virtual Assistant and/or Pet

The machine 10 provides a visual display that offers the player an option to create a character that provides added entertainment, guides the player through the operation of the machine 10, alerts the player to various information (e.g., post/start times, jackpots, and rollovers, etc.) at specific tracks, playing tips, program highlights, race odds, animal selection for specific games, race viewing options, celebrates with wins, and commiserates with losses.

In one embodiment, the machine 10 offers an option to create an assistant and/or pet. The visual display includes entries to customize the virtual assistant and/or pet by name, appearance, species, breed of species, color and/or markings, personality traits and/or other characteristics. The display also provides options related to maintenance and training of the virtual assistant and/or pet. The machine 10 can offer this option to the player based on accumulation of player rewards, player card activation, or other criteria.

The machine 10 and software allows the virtual assistant and/or pet to be compatible with and exportable to current computer software for use on a personal computer. The virtual assistant and/or pet can also be used in conjunction with a website, such as the website linked to or associated with the network of machines.

The visual display of the machine 10 provides the player with an option to create a virtual assistant in human form with gender, appearance, age, characteristics, personality, attire, needs, and/or other factors and/or requirements to be selected by the player. This option allows the player to create virtual girlfriends, wives, boyfriends, husbands, servants, children, etc. This display option can be compatible with and exportable to current software, personal computers, and/or website applications.

c. Virtual Animal Ownership/Breeding/Racing

One embodiment of the website, described above, provides the player with the option to select appearance, species, breed of species, color and/markings, racing tendencies, lineage, personality traits and/or other characteristics in order to create a virtual animal which could lead to establishment of a virtual stable or kennel. All virtual animals and stable/kennels have their own names selected by the player.

The website can provide the player with an option to provide maintenance care and/or varying levels of training for each particular virtual animal. The website can offer this option based on accumulation of player rewards, player card activation, or other criteria. In addition, the website can provide the player with an option for breeding of virtual animals within the virtual stable/kennel or between other virtual stable/kennels of other players.

Another embodiment of the website provides players/virtual owners with an option to race their animals in virtual races for additional player rewards and/or other compensation paid out in purses to the virtual owners to their player rewards account or by other means as permitted by law. All varieties of known pari-mutuel wagering can be available to the player to play or wager on the virtual races.

d. Staggered Event Timing

Participating pari-mutuel racing venues/tracks can time the start of their races in a staggered fashion. The tracks can be grouped according to their assigned or selected starting time(s). Thereby, the participating pari-mutuel operators can assist the machine 10 or network of machines to provide a continuous flow of wagering opportunities to players.

For example, five groups of tracks can be arranged. The first group starts their first race exactly on the hour. The second group starts at three (3) minutes after the hour. The third group starts at six (6) minutes after the hour. The fourth group starts at nine (9) minutes after the hour. The fifth group starts at twelve (12) minutes after the hour. The first group starts their second race at fifteen (15) minutes after the hour, and the cycle of start times by groups continues until the end of racing for the day.

The machine 10 and its respective software can require modifications, differing compilations, revisions, edits, or expansions due to the reality of the required software programming, machine playability, machine design and construction limitations, race signal availability, racing venue participation, overall timing of said participation, and jurisdictional legality issues. For example, several of the visual display frames and respective functions described above can be combined and/or edited to effect the operational flow, affect, and playability of the machine 10. In another example, the machine 10 can provide a visual display that includes race odds, picks, and/or programs on a enter wager screen so that the player can check his play against a pool of wagers and the suggested picks immediately prior to entering a wager.

In another embodiment of the invention, the machine 10 includes a smart terminal and a dumb terminal that work together to provide wagering and replay results. The terminals can be located separately or together. The smart terminal allows the player to select the game options and track selections. Upon selection of a game option, the smart terminal gives a player a play game frame that includes race odds, game specific play controls to enter a wager, how to play instructions, etc. All the game options or only the selected game options can be displayed together. After placing a wager, the smart terminal provides the player with a ticket with game option and race and track selection.

After the race results are determined and posted, the player goes to a dumb terminal and feeds in the ticket. Upon verification of the ticket, the dumb terminal displays a replay of the race results. In addition, the dumb terminal provides a display of the game option results, the wager, the outcome of the wager. If the player wins the wager, the dumb terminal provides a display having various effects (e.g., sound, lighting, video/animation effects, etc.) to indicate a winner and prints a pay out ticket to be redeemable at an appropriate cashier.

In yet another embodiment, the machine 10 functions very much the same as the "smart" terminals in the above embodiment wherein players make their bets, receive a ticket, and await the results. The display of the race and the results are displayed on a communal screen. The results are presented in special video segments that display the winning results for each game. The video segments reflect the theme and imagery of its particular game. The player views the results for comparison against their wager(s). The player claims their winnings at a traditional window. A ticket redemption feature could also be incorporated into the betting terminal.

Various modes of carrying out the invention are contemplated as being within the scope of the following claim particularly pointing out and distinctly claiming the subject matter, which is regarded as the invention.

We claim:

1. A gaming machine, comprising:
- a decoder/modem to communicate with a network of gaming machines;
- at least one of a cash dispenser-acceptor device, credit card swipe device, and reward card swipe device to distribute winnings or receive wagers;
- a tuner/receiver to receive signals representing live broadcasts of pari-mutuel race events;
- a first terminal with a touchscreen to:
  - render a graphical display of a plurality of pari-mutuel race event options on the first terminal;
  - detect a selection of a pari-mutuel race event option displayed on the first terminal;
  - detect pre-defined customizable features for a virtual assistant to assist in placing a wager;
  - render a graphical display of the virtual assistant in accordance with the pre-defined customizable features;
- at least one processor to transmit, via the decoder/modem, data indicative of a wager received via the cash dispenser-acceptor device, credit card swipe device, or reward card swipe device, the wager corresponding to a selected pari-mutuel race event; and
- a second terminal to display a result of the selected pari-mutuel race event.

2. The gaming machine of claim 1, further comprising
- a memory storage to record the signals representing live broadcast of the selected pari-mutuel race event and a processor to recall the signals from memory storage to be displayed.

3. A method of pari-mutuel wagering, the method comprising:
- communicating, by at least one processor, with a network of gaming machines using a decoder/modem;
- receiving, by the at least one processor, signals representing live broadcasts of pari-mutuel race events from a tuner/receiver;
- rendering, by the at least one processor, a graphical display of a plurality of pari-mutuel race event options on a first terminal;
- detecting, by the at least one processor, a selection of a pari-mutuel race event option displayed on a touchscreen of the first terminal;
- detecting, by the at least one processor, pre-defined customizable features for a virtual assistant to assist in placing a wager;
- rendering, by the at least one processor, a graphical display of the virtual assistant in accordance with the pre-defined customizable features;
- transmitting, by the at least one processor, data indicative of the wager to a network of gaming machines; and
- displaying, by the at least one processor, an outcome of the selected pari-mutuel race event on a second terminal.

4. The method of pari-mutuel wagering of claim 3, further comprising:
- recording, by the at least one processor, the wager; and
- comparing, by the at least one processor, the wager to the outcome of the pari-mutuel race event.

5. The method of pari-mutuel wagering of claim 3, wherein rendering the plurality of pari-mutuel race event options further comprises:
- displaying, by the at least one processor, a plurality of track selections on the first terminal;
- selecting, by the at least one processor, at least one of the plurality of track selections; and
- displaying, by the at least one processor, the plurality of pari-mutuel race event options available at the selected track selection.

6. The method of pari-mutuel wagering of claim 5, wherein displaying the plurality of pari-mutuel race event options further comprises displaying, by the at least one processor, the plurality of track selections on the first terminal.

7. The method of pari-mutuel wagering of claim 3, further comprising displaying, by the at least one processor, a corresponding pari-mutuel event corresponding to the wager on the first terminal.

8. The method of pari-mutuel wagering of claim 3, wherein displaying the plurality of pari-mutuel race event options further comprises:

displaying, by the at least one processor, a plurality of track selections corresponding to the pari-mutuel race event options;

selecting, by the at least one processor, at least one of the plurality of track selections; and displaying, by the at least one processor, the pari-mutuel event at the selected track selection on the first terminal.

9. The method of pari-mutuel wagering of claim 8, further comprising:

displaying, by the at least one processor, a plurality of alternative game options offered at the selected track; and placing, by the at least one processor, a second pari-mutuel wager on the pari-mutuel event at the selected track.

10. The method of pari-mutuel wagering of claim 3, further comprising:

displaying, by the at least one processor, a set of rules associated with a selected pari-mutuel race event option on the first terminal.

11. The method of pari-mutuel wagering of claim 3, further comprising displaying, by the at least one processor, a virtual assistant on the first terminal to assist in placing the wager.

12. The method of pari-mutuel wagering in claim 10, further comprising:

rendering, by the at least one processor, a plurality of pari-mutuel racing venues on the first terminal; and staggering, by the at least one processor, a start time of each pari-mutuel event at each pari-mutuel racing venue, wherein the pari-mutuel events correspond to the plurality of pari-mutuel race event options that are displayed.

* * * * *